March 29, 1949.　　　　G. MAXON, JR　　　　2,465,899
DUMP TRUCK
Filed Jan. 22, 1945　　　　　　　　　　4 Sheets-Sheet 1
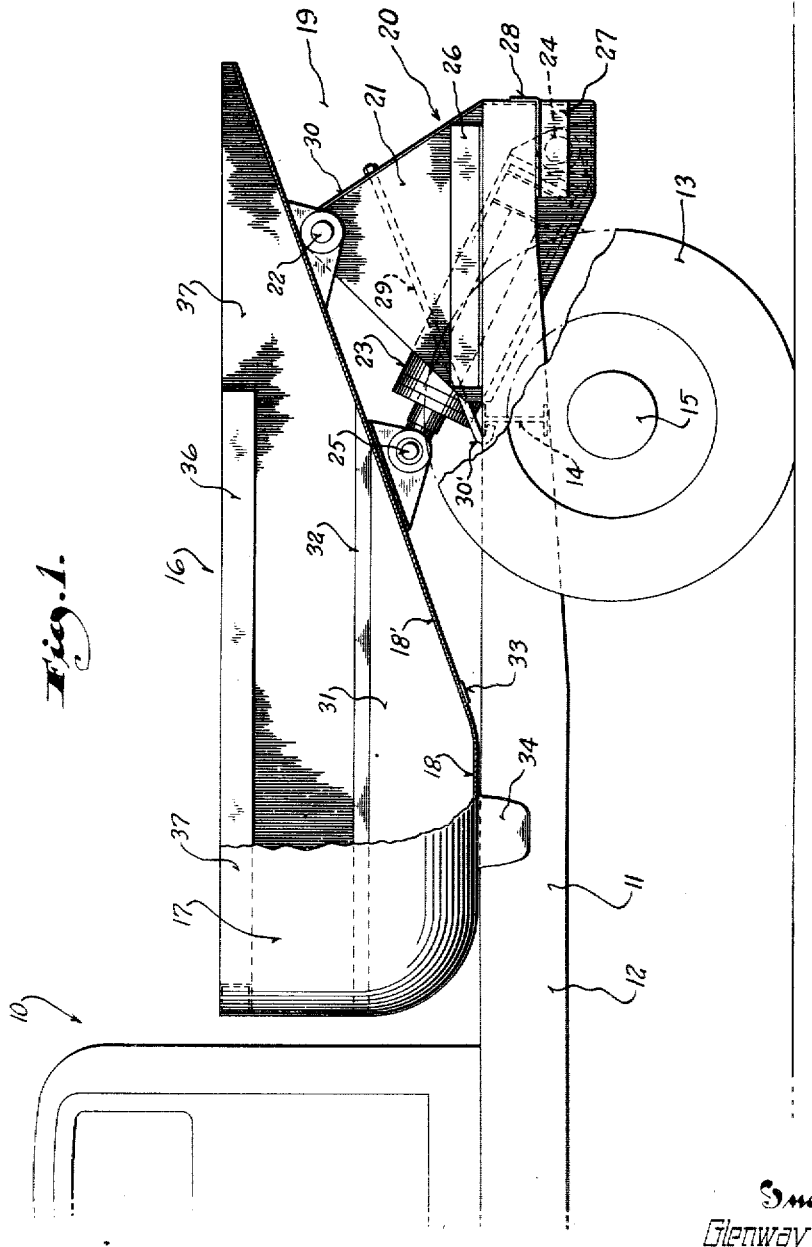
Inventor
Glenway Maxon Jr.

March 29, 1949.  G. MAXON, JR  2,465,899
DUMP TRUCK
Filed Jan. 22, 1945  4 Sheets-Sheet 2
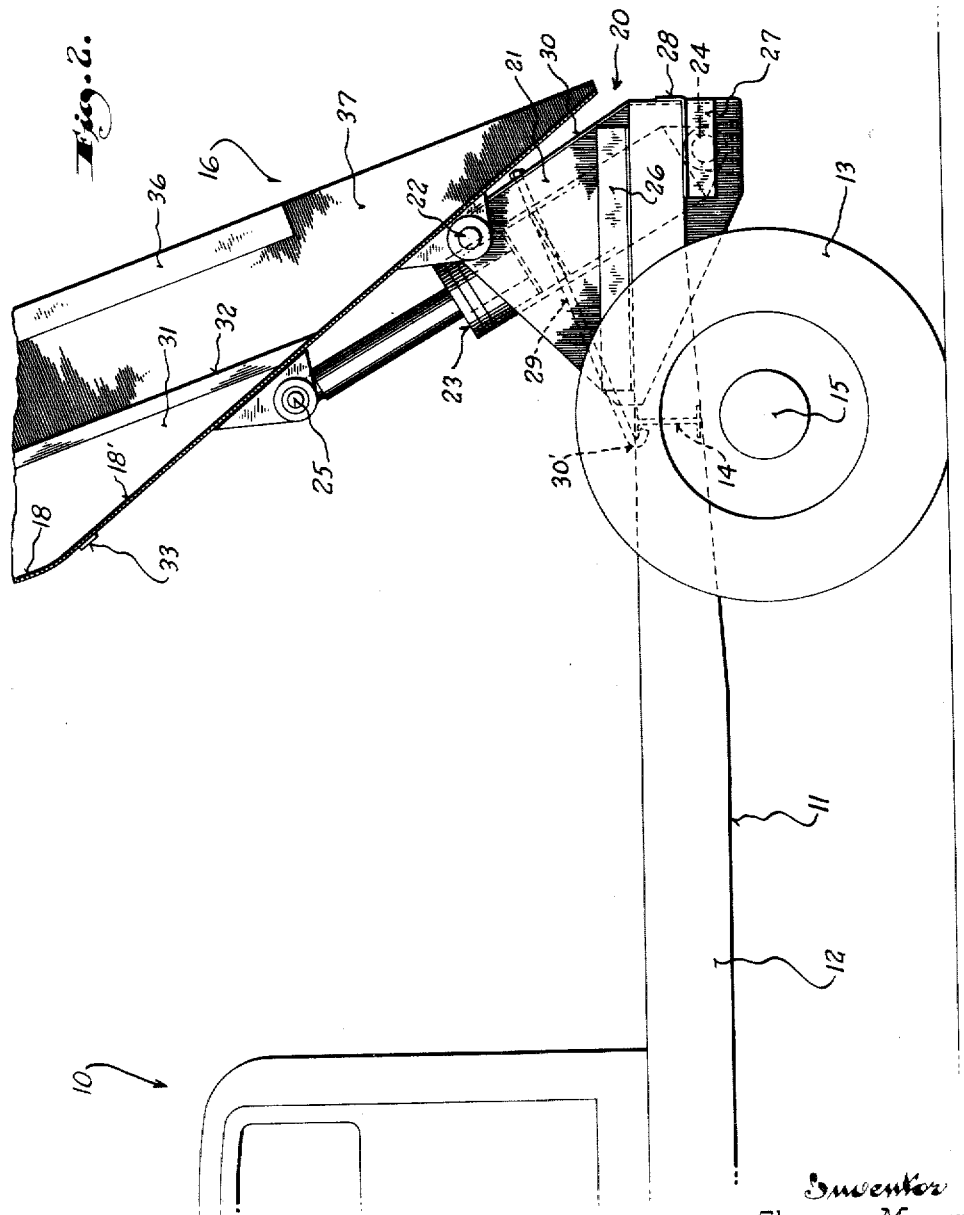

March 29, 1949.　　　G. MAXON, JR　　　2,465,899
DUMP TRUCK
Filed Jan. 22, 1945　　　　　　　　　　　4 Sheets-Sheet 3
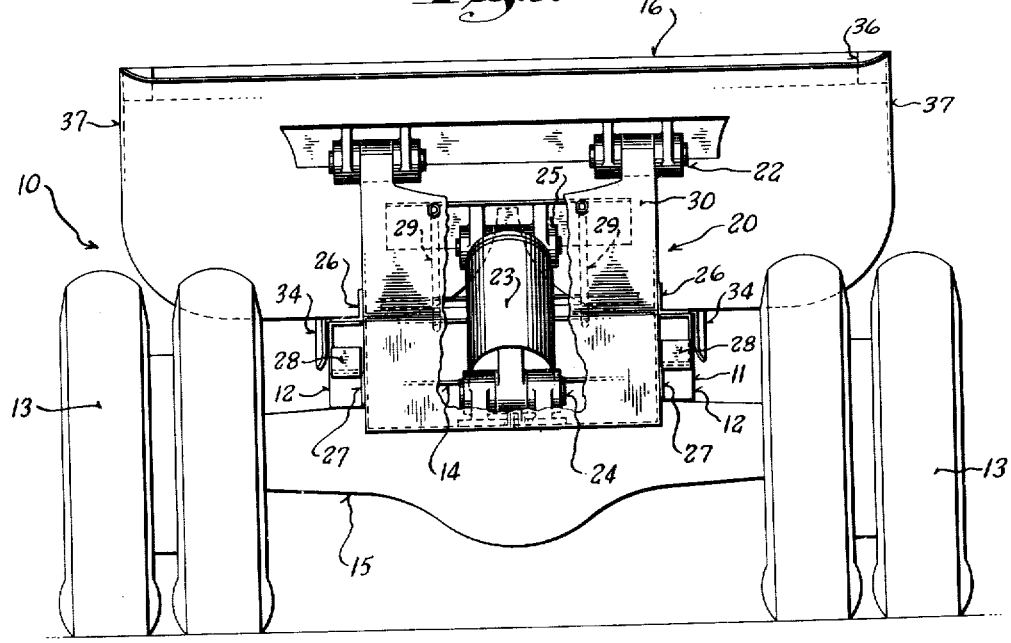
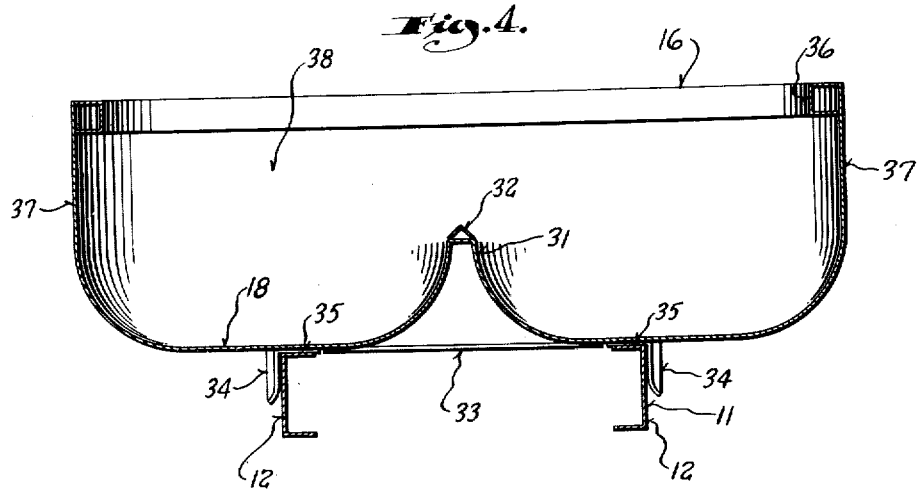
Inventor
Glenway Maxon Jr.

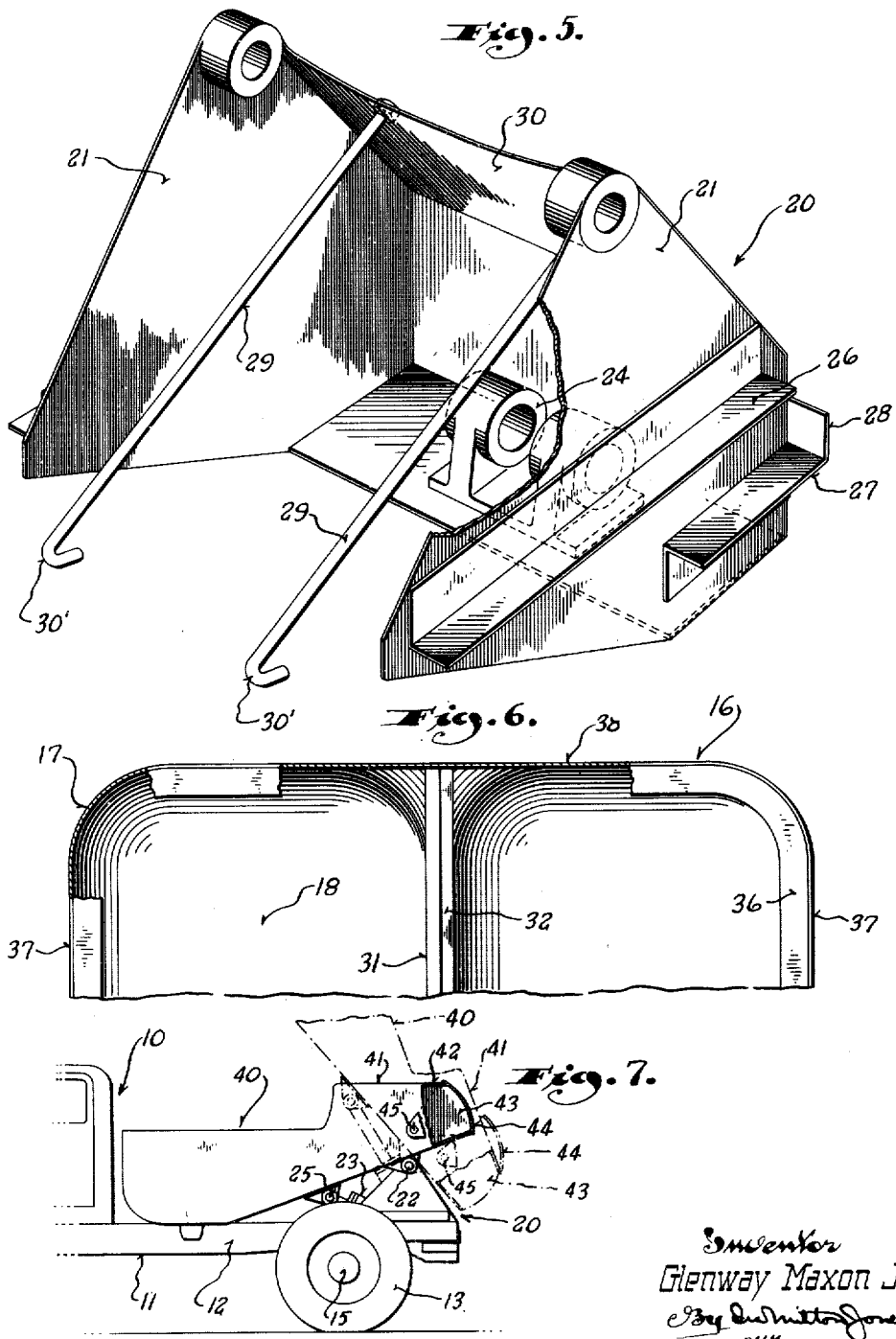

UNITED STATES PATENT OFFICE 2,465,899

DUMP TRUCK

Glenway Maxon, Jr., Milwaukee, Wis.

Application January 22, 1945, Serial No. 573,857

25 Claims. (Cl. 298—17)

This invention relates to dump trucks and refers more particularly to improvements in bodies for dump trucks and in the hoist mechanism for swinging the truck body between transit and discharge positions.

Trucks of this nature are usually provided with mechanism for swinging the body between transit and discharge positions about a pivot having its axis near the rear of the truck, and such mechanism generally comprises a hydraulic cylinder or cylinders positioned between the truck frame and the bottom of the truck body.

Such types of lifting mechanisms thus preclude mounting of the body close to the frame of the truck which is desirable, and this condition is further aggravated by the more or less conventional practice of providing the bottom of the body with either transverse or longitudinal sills to reinforce the body. Hence, the space between the bottom of dump truck bodies and truck frames at present is seldom less than twelve inches (12"), while the center of gravity of the loaded bodies are relatively high.

One of the objects of this invention, therefore, resides in the provision of an improved dump truck body which is capable of being mounted on a truck with the bottom wall of the body resting on and directly supported by the truck frame so as to effect a substantial lowering of the center of gravity of the body and consequently its load.

More particularly, it is an object of this invention to provide an improved dump truck body having stiffening or reinforcing means in the nature of a longitudinal keel inside the body at the bottom thereof so as to enable the body to rest directly on the truck frame in the transit position of the body.

A further object of this invention is to provide a dump truck with a body of the character described wherein the center keel is of sufficient height as to minimize side to side sloshing of liquid or semi-liquid materials contained in the body during transit.

Another object of this invention resides in the provision of a dump truck body wherein the bottom wall is slanted upwardly toward the rear of the body to form in effect a rear end wall for the body and to define a space between the bottom of the body and the truck frame at the rear of the truck in which the hoist mechanism is readily detachably mounted.

Another object of this invention is to provide a pivotal support for the rear of the body located a substantial distance above the frame of the truck and consequently at a substantial height above ground level so that materials in the body are discharged over the upper edge of said slanting bottom wall at a desirably high elevation upon tilting of the body upon its pivotal support.

Another object of this invention resides in the provision of a body for dump trucks wherein the bottom wall is formed with a horizontal section to rest directly on the truck frame and wherein said bottom wall has its rear portion slanted upwardly and rearwardly toward the back of the truck for pivotal connection to the hoist mechanism located in the space between the slanting bottom wall and the frame of the truck with the pivot axis located at a substantial elevation above the frame to provide a high discharge for the body.

With the above and other objects in view which will appear as the description proceeds, this invention resides in the novel construction, combination and arrangement of parts substantially as hereinafter described, and more particularly defined by the appended claims, it being understood that such changes in the precise embodiment of the hereindisclosed invention may be made as come within the scope of the claims.

The accompanying drawings illustrate two complete examples of the physical embodiment of the invention constructed in accordance with the best mode so far devised for the practical application of the principles thereof, and in which:

Figure 1 is a side elevational view of a portion of a dump truck illustrating the application of this invention thereto and with parts of the body broken away and shown in section to better illustrate the construction thereof;

Figure 2 is a view similar to Figure 1 showing the body elevated to a discharging position;

Figure 3 is an elevational view looking at the rear of the truck;

Figure 4 is a cross sectional view through the truck body showing its novel construction and its relationship to the longitudinal frame members of the truck in the transit position of the body;

Figure 5 is a perspective view of the hoist framework showing the unitary nature thereof;

Figure 6 is a fragmentary plan view looking down into the forward end of the truck body; and Figure 7 is a view similar to Figure 1 showing the truck body of this invention provided with a discharge gate at the rear of the body.

Referring now more particularly to the accompanying drawings in which like numerals indicate like parts, the numeral 10 generally designates a dump truck, only the rear portion of which is shown.

The truck comprises a frame 11 consisting of spaced longitudinal frame elements 12 in the form of channels supported at an elevation above the ground by wheels 13 shown only at the rear of the truck. The frame elements 12 project rearwardly a slight distance beyond the rear wheels 13 as clearly shown in Figure 1 and are joined at the rear of the truck by means of a transverse frame member 14 such as an I beam located substantially above the rear axle 15 of the truck.

The truck body 16 of this invention has its forward end portion 17 resting directly on the top of the frame 11 with its bottom wall 18 horizontal in the transit position of the body. This bottom wall 18 is bent upwardly and rearwardly as at 18' toward the back of the truck to terminate close to or substantially at the open top of the body to form in effect a rear end wall for the body and to provide a space 19 between the bottom wall of the body and the frame 11 at the rear of the truck.

A hoist unit 20 is mounted on the projecting tail end of the frame 11 and has spaced opposite supports 21 alongside the inner sides of the frame elements 12 and projecting up from the same into the space 19 toward the slanting bottom wall 18' of the body and pivotally connected to said slanting bottom wall 18' as at 22, close to the upper rear end of the body. This pivotal connection provides support for the rear or tail portion of the body and it is to be noted that the pivot axis is spaced a substantial distance above the frame 11 and consequently located at a considerable elevation above ground level to assure a high discharge for the body contents.

Tilting of the body about its pivotal support is effected by means of a hydraulic jack 23 having its cylinder pivotally connected with the hoist unit beneath the level of the frame as at 24, and its plunger pivotally connected with the slanting wall 18' as at 25 forwardly of the pivots 22. Thus, it will be noted that a desirably high discharge is provided for the body contents with the actual discharge being facilitated by the slanting bottom wall 18' of the body.

The hoist unit 20 is conveniently located on the tail of the frame elements 12 by means of spaced horizontal rails 26 and 27 projecting from the sides of the spaced supports 21 and which receive the ends of the frame elements therebetween and permit the unit to be slid over the end of the frame during assembly of the unit on the truck.

The hoist is held in position on the frame against sliding motion longitudinally thereof by means of abutments 28 bent up from the lower rails 27 so as to engage the ends of the frame elements 12 and preclude motion of the unit forwardly, while tension rods 29 connected with the cross plate 30 extending between the supports 21 along the rear edges thereof have their free ends 30' hooked over the top flange of the I beam 14 of the frame to preclude motion of the hoist unit rearwardly on the frame. Sidewise motion of the hoist unit is, of course, prevented by engagement of the supports 21 with the inner sides of the frame members 12.

The truck body of this invention is further characterized by a longitudinal keel 31 projecting up from the bottom wall of the body on the interior thereof. The keel 31 adds stiffness to the body and obviates the necessity for providing longitudinal or transverse stiffening sills at the underside of the body as is the present practice and thereby enables the forward end 17 of the body to rest directly on the truck frame.

With this construction it will be seen that the center of gravity of the loaded body is materially lowered, and that the side walls of the body may, if desired, extend higher than ordinary to enable increasing the capacity of the body without raising the center of gravity beyond a safe elevation.

The longitudinal keel 31 is preferably formed integrally with the bottom wall of the body by bending the central section thereof upwardly as clearly shown in Figure 4, and the keel is of sufficient height as to materially reduce the side to side sloshing of liquid or semi-liquid materials with which the body may be loaded.

Because of the rough treatment dump truck bodies are subjected to as in the loading of rock or stones, the narrow top edge of the keel 31 is preferably protected by an angle iron 32 welded thereon with its apex up. This angle extends the full length of the keel and also acts to reinforce the same.

Any tendency of the longitudinal body sections formed by the keel 31 spread relatively to one another about an axis defined by the top of the keel is prevented by means of a transverse strap 33 extending across the bottom of the forward section of the body to tie the opposite longitudinal sections of the body together.

Substantially angle shaped fins 34 secured to the bottom of the body at its forward portion thereof and at opposite sides of the center keel embrace the frame 11 as clearly shown in Figure 4 to hold the forward end of the body centered with relation to the truck frame and prevent lateral shifting thereof in transit which otherwise might result in considerable wear on the pivots 22.

The horizontal flanges 35 of these fins are preferably positioned between the bottom of the body and the tops of the longitudinal frame elements 12 so as to act as wear receiving pads for the protection of the bottom of the body.

The body is additionally reinforced by means of a channel shaped gunwale 36 welded or otherwise secured to the side walls 37 and the front end wall 38 of the body at the upper open edge of the body. The gunwale, as stated, is substantially channel shaped in cross section and has its open side placed against the inner marginal edge portions of the upright walls of the body to afford maximum protection therefor against deformation by heavy rocks and the like which may be unceremoniously loaded onto the body.

In this connection it is also desired to point out that large rocks dropped onto the gunwale would ordinarily create considerable damage to the bottom wall of the body if allowed to drop directly thereon. In the present instance, however, the bottom wall of the body is protected by the center keel 31 and its reinforcing angle 32 so that heavy rocks tilting into the body from the gunwale strike the keel before coming to rest at the bottom of the body.

In conventional truck bodies for heavy duty use as in the transportation of rock and other similar material it is the practice to cover the entire floor of the body with angles welded lengthwise along the bottom wall of the body with their apexes up to form a more or less washboard construction for reinforcing and protecting the bottom of the body.

Needless to say, this conventional expedient of reinforcing and protecting the bottoms of truck bodies adds excessive weight to the body and accordingly limits the loading capacity of the truck.

Inasmuch as the body of this invention eliminates the necessity for the "washboard" bottom, one of its chief advantages is that of less body weight for a given classification of material, it being understood that capacity is a constant.

In order to preclude the possibility of wet or semi-liquid materials sticking in the corners of the body in an annoying manner as is presently the case in conventional bodies for dump trucks, the junctures between the side and end walls with each other and with the bottom wall as well as the junctures of the sides of the center keel with the bottom wall are preferably formed of relatively large radius wall sections as clearly illustrated in Figures 1, 4, and 6.

In addition, the corners formed at the junctures between the front and side walls with the bottom wall and between the sides of the center keel and the front wall with the bottom wall, are provided by substantially spherically surfaced corner wall sections which further act to reinforce the truck body.

The modified form of truck body illustrated in Figure 7 is ideally suited for use in transporting liquid or semi-liquid materials such as concrete. As herein shown the body 40 has a chute 41 at its discharge end provided by extending the side walls of the body at the rear thereof upwardly above the gunwale. A top wall 42 joins the top edges of the extended side walls so as to leave a discharge port 43 for material to pass through as it discharges from the tilted body. The port 43 is closed by a gate 44 mounted on pivots 45 at the opposite sides of the body so as to enable swinging of the gate between closed transit positions as shown in full lines in Figure 7 and open discharging positions as illustrated in broken lines.

The tail portion 41 thus forms a convenient chute for the discharge of materials such as concrete to facilitate unloading of the truck. In all other respects the Figure 7 embodiment of this invention is identical to that previously described.

From the foregoing description taken in connection with the accompanying drawings, it will be evident that the improved truck body of this invention has the combined features of light weight with maximum strength, and low center of gravity with high discharge.

What I claim as my invention is:

1. In a dump truck having a frame: a truck body having a bottom wall a portion of which at the front end of the body rests on the truck frame so that the body receives support therefrom in the transit position of the body, the rear portion of said bottom wall slanting upwardly and rearwardly substantially to the open top of the body so as to form in effect the rear end wall of the body over which the body contents are adapted to be discharged and to define a space between said bottom wall and the frame at the rear of the truck; a hoist unit mounted on said frame at the rear of the truck and including body supporting means extending upwardly with respect to the truck frame into said space between the slanting bottom wall of the body and the frame; a pivotal connection between the body and said supporting means close to said slanting bottom of the body and adjacent to the rear of the body so as to be at a substantial elevation above the truck frame to thereby assure high discharge of material from the body upon swinging of the body about its pivotal support to a discharge position in which the front end of the body is uppermost; and means connected between the hoist unit and the body for effecting swinging of the body about its pivotal support to said discharging position.

2. In a dump truck having spaced longitudinal frame elements connected by a transverse frame element adjacent to the rear axle of the truck and a truck body a portion which rests on the longitudinal frame elements of the truck in the transit position of the body: a hoist unit mounted on said longitudinal frame elements at the rear ends thereof adjacent to the rear axle of the truck and including spaced upright supports; means for detachably securing the hoist unit in position on the longitudinal frame elements of the truck including spaced horizontal rails on each of said supports for slidably receiving the rear ends of said frame elements therebetween, an abutment on each of said supports engageable with the ends of said frame elements to define the assembled position of the hoist unit on said frame elements, and tension means connected between the hoist unit and said transverse frame element to preclude sliding motion of the hoist unit in the direction of its disassembly from the frame; pivot means on said upright supports connectable with the rear portion of the body to provide for tilting of the same to load discharging position; and means carried by the hoist unit and connectable with the truck body for effecting swinging of the body on its pivotal support to said discharge position.

3. A body for a truck characterized by the provision of a longitudinal keel inside the body for reinforcing the same, and bent up from the bottom wall portions of the body so as to be integral therewith, and further characterized by the provision of an angle iron substantially covering and secured to the top of said keel with its apex uppermost and extending substantially the full length of the keel to stiffen and protect the same.

4. A body for a truck characterized by the provision of a longitudinal keel inside the body bent up from the bottom wall portions thereof so as to be integral with the body, said keel being substantially narrow at its top portion spaced above the bottom wall of the body, and the sides of the keel being curved to meet the bottom wall of the body in arcs of substantial radii, and further characterized by the provision of a transverse tie member connecting the longitudinal body sections thus formed at the exterior of the body to preclude spreading of the body about a longitudinal axis substantially defined by the top portion of the keel.

5. A body for a dump truck characterized by a longitudinal keel inside the body at the bottom thereof and by substantially large radius wall portions joining the sides of the keel with the bottom wall of the body and joining the side and end walls of the body with each other and with the bottom wall of the body, and further characterized by substantially spherically surfaced corner sections at the junctures of said side walls and the keel with the end and bottom walls for reinforcing the body and for lessening the tendency of materials carried in the body from sticking thereto at its corners.

6. A body for a dump truck, comprising: a bottom wall having a horizontal portion and an upwardly slanting tail portion extending rearwardly from the horizontal portion and providing in effect the rear end wall over which materials are adapted to be discharged from the body; spaced upright side walls joined to said bottom wall by substantially large radius wall sections; a substantially upright end wall at the forward end of the body joined to said bottom wall by substantially large radius wall sections; and substantially spherically surfaced corner sections at the junctures of said end and side walls with the bottom wall for reinforcing the body and for lessening the tendency of such materials as concrete, iron ore, clay and the like, from sticking to the body at the corners thereof.

7. A body for a dump truck comprising: a bottom wall having a horizontal portion and an upwardly slanting tail portion extending rearwardly from the horizontal portion substantially to the top of the body at its back end so as to provide in effect the rear end wall over which materials are adapted to be discharged from the body; spaced upright side walls joined to said bottom wall; and an upright end wall at the forward end of the body joined to said bottom wall and to the side walls, said side walls and the end wall joining each other and the bottom wall by substantially large radius wall sections at the junctures thereof and the junctures of said end and side walls with the bottom wall being substantially spherically surfaced so as to reinforce the body and to lessen the sticking of materials such as concrete, iron ore, clay and the like, in the corners thereof.

8. In combination with a dump truck having a frame: a body for the truck having a bottom wall slanted upwardly toward the rear of the body; mounting means secured to the frame; and means cooperable with said mounting means and secured to the bottom wall of the body adjacent to its rear end for pivotally supporting the body for swinging motion about an axis disposed a substantial distance above the frame of the truck so as to assure the discharge of materials from the body at a considerable elevation above ground level upon swinging of the body about its pivotal support to a discharging position with the front end of the body elevated.

9. In combination with a dump truck having a frame: a body for the truck the front end portion of which rests on the frame so that the body receives substantially direct support from the frame, said body having a bottom wall slanted upwardly toward the rear of the body to provide in effect a rear end wall for the body; means carried by the frame providing a pivotal support for the rear end of the body with the pivot axis located a substantial distance above the frame and adjacent to the rear end of the body so as to assure the discharge of materials from the body at a considerable elevation above ground level upon swinging of the body about its pivotal support to a discharging position at which the front end of the body is elevated; and fins on the forward end of the body projecting downwardly from the bottom wall thereof and embracing the frame to hold the forward end of the body centered on the frame and against side play in the transit position of the body.

10. In combination with a dump truck having a frame: a body for the truck the front end portion of which rests on the frame so that the body receives substantially direct support from the frame, said body having a bottom wall slanted upwardly toward the rear of the body to provide in effect a rear end wall for the body; means carried by the frame providing a pivotal support for the rear end of the body with the pivot axis located a substantial distance above the frame and adjacent to the rear end of the body so as to assure the discharge of materials from the body at a considerable elevation above ground level upon swinging of the body about its pivotal support to a discharging position at which the front end of the body is elevated; pads on the underside of the forward end of the body interposed between the bottom wall of the body and the frame to receive the wear incidental to supporting the front of the body on the frame; and downwardly depending fins on said pads embracing the outsides of the truck frame to hold the body centered thereon in the transit position of the body.

11. In combination with a dump truck having a frame: a body for the truck having a bottom wall substantially horizontal at the front end of the body and slanting upwardly toward the rear of the body to provide in effect a rear end wall for the body, the forward end of the body resting on the frame so that the body receives substantially direct support from the frame; and means carried by the frame for supporting the rear end of the body including spaced uprights pivotally connected with the slanting wall of the body near its upper rear end to provide for pivotal motion of the body to a discharging position about an axis spaced a substantial distance above the frame so that the discharge of materials from the body is effected at a substantial elevation above ground level.

12. In combination with a dump truck having a frame: a body for the truck having a bottom wall substantially horizontal at the front of the body and slanting upwardly toward the rear of the body to provide in effect a rear end wall for the body, the forward end of the body resting on the frame so that the body receives substantially direct support from the frame; means carried by the frame for supporting the rear end of the body including spaced uprights pivotally connected with the slanting wall of the body near its upper rear end to provide for pivotal motion of the body to a discharging position about an axis spaced a substantial distance above the frame so that the discharge of materials from the body is effected at a substantial elevation above ground level; and means pivotally connected with the slanting wall of the body forwardly of and at a lower elevation than said pivotal support for the body for effecting swinging motion of the body about its pivotal supports to its discharging position.

13. In combination with a dump truck having a frame: a body for the truck having a bottom wall the rear portion of which slants upwardly toward the rear of the body to provide in effect a rear end wall for the body; means on the frame supporting the rear end of the body for pivotal motion about a transverse axis spaced a substantial distance above the frame to enable tilting of the body and discharging of its contents over the upper edge of said slanting bottom wall; a chute on the rear end portion of the body having sides connected with the side walls of the body and extending above the level of the upper edge of said slanting bottom wall to direct materials thereover in the discharge position of the body; and a gate pivotally carried by the body at its rear portion and cooperating with the sides of the chute and said upper edge of the slanting bottom wall to normally close the chute, said gate being movable relatively to the chute to open the chute so as to allow discharge of materials from the body.

14. In combination with a dump truck having a frame: a body for the truck having side walls and a bottom wall slanted upwardly toward the rear of the body and terminating substantially at the level of the upper edges of the side walls of the body and providing in effect the rear end wall for the body over which materials are adapted to be discharged from the body; a chute structure on the body at the rear portion thereof having side walls substantially forming upright extensions of the side walls of the body and extending a distance above and forwardly of said top edge of the bottom slanting wall to direct materials thereover in the discharge position of the body; a gate pivotally mounted on the truck body at its rear portion for swinging motion from a position cooperating with the sides of the chute and said top edge of the slanting bottom wall closing the chute to a discharging position swung out of the path of materials discharging from the body in the discharge position thereof; and means supporting the rear end of the body for swinging motion about a transverse axis adjacent to the upper rear edge of said slanting bottom wall and disposed a substantial distance above the frame so as to enable swinging of the body to and from a discharge position with the forward end of the body uppermost.

15. In combination with a dump truck having a frame: a body for the truck having a bottom wall the rear portion of which slants upwardly toward the rear of the body to provide in effect a rear end wall for the body; means on the frame supporting the rear end of the body for pivotal motion about a transverse axis spaced a substantial distance above the frame to enable tilting of the body and discharging of its contents over the upper edge of said slanting bottom wall; a gate; and means pivotally mounting the gate on the rear end portion of the body to swing from and toward a closed position blocking the discharge of the body contents over the upper edge of said slanting bottom wall.

16. In combination with a dump truck having a frame: a body for the truck pivotally supported from the frame for swinging motion about an axis transverse to the frame and adjacent to the rear thereof, said body having a discharge port at its rear end and having a bottom wall slanting upwardly toward said discharge port, and a top wall adjacent to the rear end of the body disposed at an angle to said slanting bottom wall and cooperating therewith to provide a funnel-like rear for the body converging toward said discharge port; and a gate pivotally mounted on the body at the rear end portion thereof to swing from and toward a position closing said port so as to control the discharge of the body contents through the port.

17. In a dump truck: a frame; a body supported by said frame; discharge means at the rear of the body; a pivotal connection between the body and the frame providing for swinging motion of the body about a transverse axis adjacent to the rear of the body and spaced a substantial distance above the frame; and a bottom wall for the body sloping upwardly and rearwardly toward said discharge means with the rear of said bottom wall at an elevation above said pivot axis to insure emptying of materials in the body through said discharge means at a high elevation upon tilting of the body about its pivot axis to a load discharge position in which the front of the body is uppermost.

18. A tiltable body for a dump truck characterized by: a bottom wall at least a portion of which slants upwardly toward the rear of the body; substantially upright side walls joined with the outer edge portions of the bottom wall and with each other by substantially large radius wall portions with substantially spherically surface corner sections at points where more than two wall sections join one another for lessening the tendency of materials carried in the body to stick thereto at its corners; and means on said body adapted to be connected with the truck chassis to provide for pivotal motion of the body about a transverse axis adjacent to the rear end of its slanting bottom wall.

19. In a truck body having side and bottom walls, reinforcing means for the body comprising: a central longitudinal keel along the bottom wall comprising bottom wall sections turned upwardly out of the plane of the bottom wall on a substantial radius on either side of the longitudinal center line of the body to raise the center of the bottom above the plane of the bottom wall; and a stiffener secured to the side walls and extending around the upper marginal edges thereof.

20. A body for a truck characterized by the provision of a longitudinal stiffening keel inside the body comprising portions of the bottom wall on each side of its longitudinal centerline and adjacent thereto turned upwardly on a substantial radius and connected with one another a distance above the plane of the bottom wall so that said keel forms a longitudinal reinforcing member for the body.

21. In a dump truck having a frame the rear end portion of which projects a distance rearwardly of the back wheels of the truck, and a body adapted to be tilted to load discharging position about a transverse axis near the rear of the frame: a readily detachable hoist unit for tilting the body; means mounting said hoist unit on the projecting end of the frame including spaced horizontal rails for slidably receiving the side members of the frame therebetween, said rails enabling the hoist unit to be slid into assembly on the frame over the projecting end thereof; pivot means on the hoist unit connectable with the body to provide for tilting of the body to load discharging position; and body tilting means carried by the hoist unit and connectable with the body for tilting the body on said pivot means of the hoist unit.

22. A body for a truck characterized by the provision of a longitudinal keel inside the body for reinforcing the same, and bent up from the bottom wall portions of the body so as to be integral therewith, and further characterized by the provision of stiffening means along the top of said keel extending substantially the full length thereof to lend rigidity to the keel.

23. A body for a dump truck characterized by the provision of a longitudinal keel on the bottom wall of the body at the interior thereof comprising a pair of adjacent upwardly extending wall sections having their lower ends joined to the bottom wall by relatively large radius wall portions, and joined to one another adjacent to their upper edges.

24. In combination with a dump truck having a frame: a body for the truck pivotally supported from the frame for swinging motion about a transverse axis spaced a substantial distance above the frame and adjacent to the rear of the body, said body having a discharge port at its rear end, and having a bottom wall slanting upwardly toward said discharge port and a top wall at the rear end of the body disposed at an angle to said slanting bottom wall and cooperating therewith to provide a funnel-like rear for the body converging toward said discharge port; and a gate pivotally mounted on the body at the rear thereof to swing from and toward a position closing said port so as to control the discharge of the body contents through the port.

25. In combination with a dump truck having a frame: a body for the truck pivotally supported from the frame for swinging motion about a transverse axis spaced a substantial distance above the frame, said body having a discharge port and a top wall at the rear thereof disposed at an angle to the bottom wall of the body and cooperating therewith to provide a funnel-like tail portion for converging materials toward said discharge port upon swinging of the body about its pivot axis to a load discharging position in which the front of the body is uppermost; and a gate pivotally mounted on the body at the rear end portion thereof to swing from and toward a position closing said port so as to control the discharge of the body contents through the port.

GLENWAY MAXON, Jr.

REFERENCES CITED

The following references are of record in the file of this patent:

UNITED STATES PATENTS

| Number | Name | Date |
| --- | --- | --- |
| 372,470 | Hill | Nov. 1, 1887 |
| 1,113,443 | Isom, Jr. | Oct. 13, 1914 |
| 1,133,941 | Dilliard | Mar. 30, 1915 |
| 1,542,877 | Harman | June 23, 1925 |
| 2,054,706 | Morley | Sept. 15, 1936 |
| 2,358,224 | Golay | Sept. 12, 1944 |